United States Patent Office 3,528,931
Patented Sept. 15, 1970

3,528,931
INDICATOR COMPOSITION OF TETRAETHYL AMMONIUM BROMIDE PERCHLORIC ACID AND CRYSTAL VIOLET
James L. Dunn, Jr., and James C. Renfro, Lake Jackson, Tex., assignors to The Dow Chemical Company, Midland, Mich., a corporation of Delaware
No Drawing. Filed Dec. 28, 1967, Ser. No. 694,040
Int. Cl. C09k 3/00; G01n 31/22
U.S. Cl. 252—408    4 Claims

ABSTRACT OF THE DISCLOSURE

This invention relates to an indicator composition comprising tetraethyl ammonium bromide, perchloric acid and crystal violet useful to detect, by color indication, the concentration of acid-acceptor type inhibitors in chlorinated solvents.

---

This invention relates to a method and composition for the detection of certain stabilizers in chlorinated solvents, and more particularly relates to a method and composition for the testing of stabilized chlorinated solvents containing an acid-acceptor type inhibitor to determine whether or not such an inhibitor is present in the desired stabilizing quantities.

As is well known in the art, most chlorinated solvents such as methylene chloride, perchloroethylene, trichloroethylene, 1,1,1-trichloroethane and 1,1,2-trichloroethane require the presence of an inhibitor before such solvents are industrially useful for purposes such as liquid and vapor degreasing. Inhibitors of the acid-acceptor type such as butylene oxide, epichlorohydrin, n-methyl pyrrole, tri-N-butylamine and diisopropylamine are normally employed and must be maintained at a definite level in order to provide the required degree of stabilization. As the solvent is used, the inhibitor concentration normally decreases and must be periodically replenished. However methods of analysis to determine the concentration of such inhibitors have heretofore been difficult, time consuming, and no simple tests have been designed which would enable one to quickly determine the inhibitor concentration in a chlorinated solvent.

It is an object of this invention to provide a method whereby the concentration of an acid-acceptor type inhibitor in a chlorinated hydrocarbon solvent can be quickly and easily determined. A further object is to provide an indicator composition which by color indication will define the inhibitor concentration in the chlorinated solvent. These and other objects and advantages of the present invention will become apparent from a reading of the following detailed description.

It has now been discovered that a composition consisting essentially of a solution of tetraethyl ammonium bromide, perchloric acid, and crystal violet, when contacted with a chlorinated solvent containing an acid-acceptor type inhibitor will act as an indicator and produce a color change from yellow, indicating that no inhibitor is present, through chartreuse (yellow-green), blue-green and blue to dark blue or purple, indicating the presence of over 600 p.p.m. of such inhibitor.

It is preferred that the indicator composition of this invention be employed as a relatively dilute solution of the indicator components in a liquid organic acid such as acetic acid. The concentration of tetraethyl ammonium bromide is advantageously between about 0.5 and 5.0 weight percent, the perchloric acid between about 0.05 and about 2.5 weight percent and the crystal violet between about 0.00025 and about 0.025 weight percent. Within these concentrations and proportions, the indicator composition provides the following colors when contacted with chlorinated solvents having various concentrations of acid-acceptor type inhibitors:

| Color after 5 minutes exposure to vapor: | Concentration of inhibitor in vapor (p.p.m.) |
|---|---|
| Yellow | 0 |
| Chartreuse | 50–150 |
| Blue-green | 150–250 |
| Blue | 300–500 |
| Deep blue or purple | 600 and above |

Some slight variation in sensitivity is encountered depending upon the particular chlorinated solvent tested and upon the nature of the acid-acceptor type inhibitor employed therein. Likewise, variation in sensitivity may be achieved by employing a greater or lesser proportion of perchloric acid in the indicator composition. For example, a lesser proportion of perchloric acid will produce a chartreuse color for 0 p.p.m. inhibitor and a blue-green color for 50–150 p.p.m. of inhibitor while a greater proportion will be less sensitive to a lower range of inhibitor concentration.

A preferred embodiment of the present invention comprises determination of the level of acid-acceptor type inhibitor in a chlorinated solvent by admixing a sample of the chlorinated solvent to be tested with the indicator composition of this invention. The mixture quickly assumes a color which shows the level of acid-acceptor type inhibitor contained within the chlorinated solvent being tested. The proportion of indicator composition employed with the sample of chlorinated solvent varies depending upon the depth of color desired and upon the concentration of the indicator composition in the indicator solution. In general, however, when a 1 N solution of indicator is employed equal volumes of chlorinated solvent and indicator solution provide adequate color for determination of inhibitor level in the chlorinated solvent.

As used herein, the expression, "acid-acceptor type inhibitor," means:

An organic chemical compound containing a functional group or groups that will react with any acid, but more especially with halogen-containing acids such as for example HCL and HBr. Examples of common acid-acceptor type inhibitors used in the stabilization of chlorinated solvents include butylene oxide, epichlorohydrin, N-methyl pyrrole, tri-N-butylamine, diisopropylamine, and the like.

The following examples are provided to more fully illustrate the invention but are not to be construed as limiting to the scope thereof:

EXAMPLE 1

An indicator solution was prepared by mixing 100 ml. of 0.1 N tetraethylammonium bromide, 5 ml. of 0.1 N perchloric acid and 2.5 ml. of crystal violet (0.1% w./v.). each of the above solutions was made up in glaical acetic acid. One milliliter of this solution was mixed with an equal volume of a sample of 1,1,1-trichloroethane containing 200 p.p.m. of butylene oxide. The solution turned a bluish-green color, indicating the presence of 150–250 p.p.m. of inhibitor which was confirmed by titration with 0.1 normal HBr in acetic acid. Additional experiments conducted in the same manner but with different concentrations of the butylene oxide inhibitor showed that the indicator solution turned blue in color when in the presence of 300–500 p.p.m. of the inhibitor and, when the inhibitor was absent, the color of the indicator was yellow.

EXAMPLE 2

The indicator solution of Example 1 was successfully used to determine the level of butylene oxide inhibitor in methyl chloroform which contained dioxane, nitromethane and butylene oxide as stabilizers. Such indicator solution was also used to determine the acid-acceptor type inhibitor level in samples of trichloroethylene containing one of the following acid-acceptor-type inhibitors: butylene oxide, epichlorohydrin, n-methyl pyrrole, ethyl acetate, diisobutylene and diisopropylamine.

Various modifications can be made in the present invention without departing from the spirit or scope thereof for it is understood that we limit ourselves only as defined in the appended claims.

We claim:

1. An indicator composition useful to determine the concentration of acid-acceptor type inhibitors contained in a chlorinated solvent which comprises a mixture of tetraethyl ammonium bromide, perchloric acid and crystal violet in solution in a liquid organic acid.

2. The composition of claim 1 wherein the liquid organic acid is acetic acid.

3. The composition of claim 1 wherein the concentration of tetraethyl ammonium bromide is between about 0.5 and about 5.0 weight percent, the concentration of perchloric acid is between about 0.05 and about 2.5 weight percent and the concentration of crystal violet is between about 0.00025 and about 0.025.

4. A process for the determination by color indication of the concentration of acid-acceptor type inhibitor in a chlorinated solvent which comprises admixing with said inhibited chlorinated solvent an indicator solution containing from about 0.5 to about 5.0 weight percent tetraethyl ammonium bromide, from about 0.05 to about 2.5 weight percent of perchloric acid and from about 0.00025 to about 0.025 weight percent crystal violet in an acetic acid solvent and observing the color of such admixture.

References Cited
UNITED STATES PATENTS 3,251,891   5/1966   Cormany _____ 260—652.5

JOHN T. GOOLKASIAN, Primary Examiner

M. E. McCAMISH, Assistant Examiner